United States Patent
Sheng

(10) Patent No.: US 7,593,221 B2
(45) Date of Patent: Sep. 22, 2009

(54) ANTI-VIBRATION AND ANTI-ELECTROMAGNETIC-INTERFERING FRAME FOR HARD DISK

(75) Inventor: Yen-Long Sheng, Jhonghe (TW)

(73) Assignee: Mitac Technology Corp., Hsinchu (TW)

( * ) Notice: Subject to any disclaimer, the term of this patent is extended or adjusted under 35 U.S.C. 154(b) by 17 days.

(21) Appl. No.: 12/000,685

(22) Filed: Dec. 17, 2007

(65) Prior Publication Data

US 2008/0291618 A1 Nov. 27, 2008

(30) Foreign Application Priority Data

May 25, 2007 (CN) .................. 2007 1 0028187

(51) Int. Cl.
*H05K 7/04* (2006.01)
(52) U.S. Cl. ................. 361/679.35; 361/818; 174/35 R
(58) Field of Classification Search ................. 361/685, 361/679.35, 818; 174/35 R
See application file for complete search history.

(56) References Cited

U.S. PATENT DOCUMENTS 6,049,469 A * 4/2000 Hood et al. ................. 361/818
6,058,016 A * 5/2000 Anderson et al. ........... 361/727
6,614,652 B2 * 9/2003 White et al. ................. 361/684
6,751,093 B1 * 6/2004 Hsu et al. .................... 361/685
7,170,013 B2 * 1/2007 Lewis ......................... 174/354
2006/0232924 A1 * 10/2006 Liu et al. ..................... 361/685

* cited by examiner

Primary Examiner—Jayprakash N Gandhi
Assistant Examiner—Ingrid Wright
(74) Attorney, Agent, or Firm—Quintero Law Office

(57) ABSTRACT

An anti-vibration and anti-EMI frame includes an electrically conductive casing having a plurality of side panels, a front opening and a rear opening for receiving a hard disk drive therein before being fixed in an electronic device. The casing is integrally formed on the side panels with a plurality of outward protruded elastic members, and at the rear opening with a stop plate and two mounting plates. The stop plate prevents the hard disk drive from moving out of the casing via the rear opening thereof; the casing is fixed in the electronic device by threading screws through the mounting plates into the electronic device; and the elastic members on the casing are internally in contact with the electronic device. Therefore, the casing protects the hard disk drive against vibration and shields electromagnetic interference to and from the hard disk drive.

10 Claims, 4 Drawing Sheets

ANTI-VIBRATION AND ANTI-ELECTROMAGNETIC-INTERFERING FRAME FOR HARD DISK

FIELD OF THE INVENTION

The present invention relates to a frame for hard disk drive, and more particularly to an anti-vibration and anti-EMI frame for hard disk drive.

BACKGROUND OF THE INVENTION

With the constantly reduced size of the notebook computer, the conventional 2.5-inch hard disk drive (HDD) could no longer meet the requirement of the compact notebook computer, and a new 1.8-inch HDD has been developed and widely adopted for use. The 1.8-inch HDD produced by some notebook computer manufacturers, such as Toshiba, is not provided with screw holes. Such hard disk drive is difficult to mount. Currently, most notebook computer manufacturers utilize a rubber material and a supporting frame to fix the hard disk drive in place in the notebook computer. While it protects the hard disk drive against vibration, the rubber material is not electrically conductive and is not able to ground the hard disk drive. Therefore, some other structural material must be additionally used to achieve the purpose of grounding the hard disk drive. The additional structural material would inevitably increase the manufacturing cost of the notebook computer.

Anti-vibration and grounding are two major tests that must be conducted by existing notebook manufacturers for the hard disk drive when the same is installed on a notebook computer, so as to ensure the hard disk drive meets the standards. In addition, it is known the hard disk drive in operation would inevitably cause electromagnetic interference (EMI) and adversely affect the operation of the notebook computer and the user's health. Therefore, many countries demand that electronic products must pass the electromagnetic compatibility (EMC) test before they are allowed for sale in the market.

Taiwan Invention Application No. 094207592 discloses an anti-vibration structure for hard disk drive, which is a case having a plurality of sides and two open front and rear ends. A plurality of elastic members are integrally formed on the a plurality of sides, so that a hard disk drive may be extended into and received in the case via one open end thereof. The elastic members buffer an impact on the hard disk drive when an electronic device having the hard disk drive mounted therein collides with some other things. While the above invention effectively solves the vibration problem encountered by the hard disk drive, it does not provide the function of shielding EMI to and from the hard disk drive.

Another Taiwan Invention Application No. 094211325 discloses an anti-EMI and anti-vibration grounding device for hard disk drive, which includes a hard disk drive and two electrically conductive frames. Each of the two conductive frames is a lying U-shaped member including an elongated vertical wall and two horizontal walls parallelly extended in the same direction from two opposite upper and lower edges of the vertical wall to thereby define a sideward opening. The two horizontal walls of each conductive frame are provided with a plurality of elastic protrusions each, and the sideward openings of the two conductive frames may be separately fitted on two opposite sides of the hard disk drive, such that the elastic protrusions are compressed against a lower cover and an upper cover of a drive bay of an electronic device when the hard disk drive is received in the drive bay. While the grounding device for hard disk drive disclosed in the above invention solves the vibration and EMI problems encountered by the hard disk drive, it is of a complicate two-piece structure to thereby increase the difficulty and cost in manufacturing and assembling a notebook computer.

SUMMARY OF THE INVENTION

A primary object of the present invention is to provide a one-piece anti-vibration and anti-EMI frame for hard disk drive that could be easily manufactured and assembled at reduced manufacturing cost, and protects a hard disk drive disposed therein against vibration and shields EMI to and from the hard disk drive.

To achieve the above and other objects, the anti-vibration and anti-EMI frame for hard disk drive according to the present invention includes an electrically conductive casing having a plurality of side panels, a front opening and a rear opening for receiving a hard disk drive therein before being fixed in a drive bay of an electronic device. The casing is integrally provided on the side panels with a plurality of outward protruded elastic members which has a convex portion, and at the rear opening with a stop plate and two mounting plates. The stop plate prevents the hard disk drive from moving out of the casing via the rear opening thereof. The casing is fixed in the drive bay of the electronic device by threading screws through the mounting plates into the drive bay. At least one of the elastic members on the casing has an offset of protrusion larger than that of other elastic members.

Preferably, the elastic members are arched in form to provide an increased anti-vibration effect.

Preferably, the convex portions of the elastic members are designed to have two or more different offsets of protrusion. The elastic members having convex portion with a larger offset of protrusion have a smaller coefficient of elasticity, while the elastic members having convex portion with a smaller offset of protrusion have a larger coefficient of elasticity. And, the elastic members having different offsets of protrusion are disposed on the casing in staggered arrangement.

When the hard disk drive is pushed into the casing via the front opening thereof and the casing is fixed in the electronic device, the elastic members provided on the casing are in contact with the electronic device. Therefore, the conductive casing not only shields EMI to and from the hard disk drive, but also protects the hard disk drive against vibration.

The present invention is superior to the prior art because the electrically conductive casing is integrally formed with outward protruded elastic members, which are internally in contact with the electronic device to protect the hard disk drive against vibration while providing a grounding effect. Moreover, the present invention may be easily manufactured and assembled to enable largely reduced manufacturing cost thereof.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
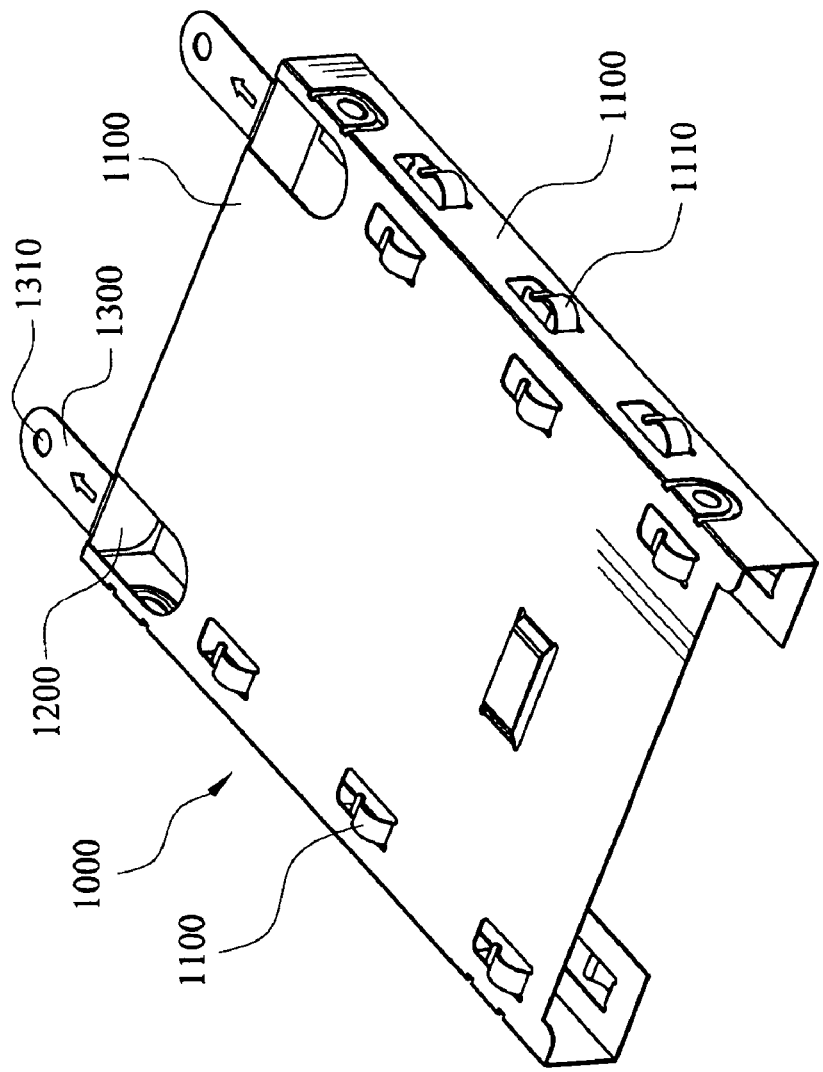
FIG. 1 is a top perspective view of an anti-vibration and anti-EMI frame for hard disk drive according to a first embodiment of the present invention.
Figure 2:
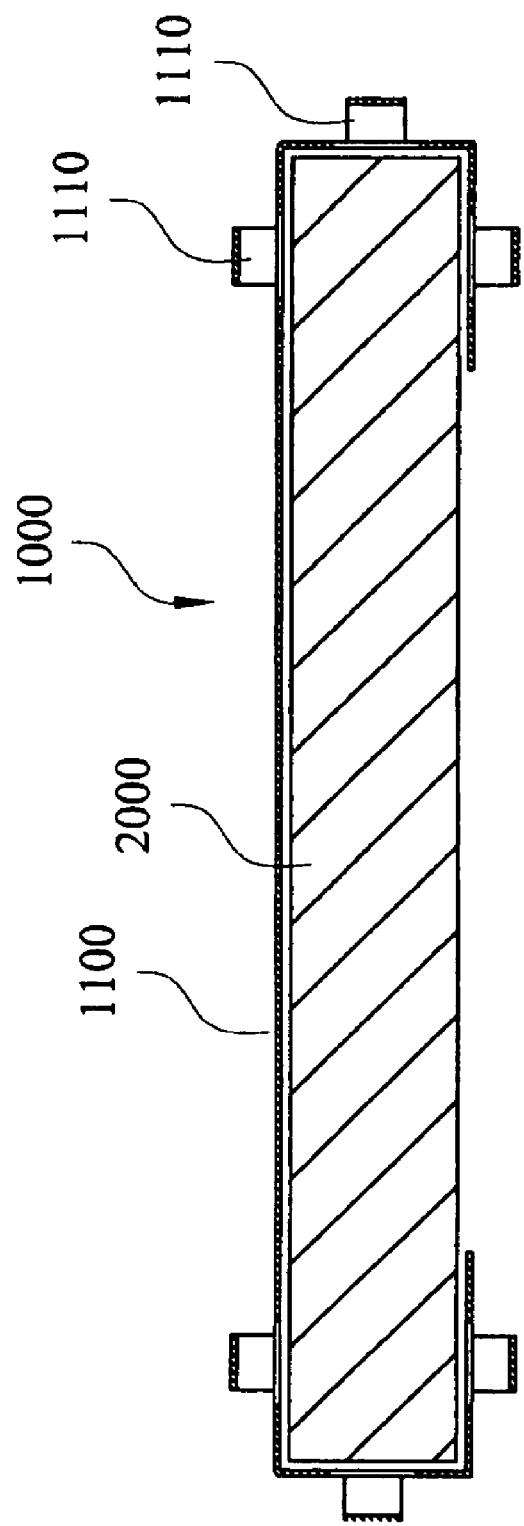
FIG. 2 is a cross sectional view of the anti-vibration and anti-EMI frame shown in FIG. 1 with a hard disk drive disposed therein.

Please refer to FIG. 1. An anti-vibration and anti-EMI frame for hard disk drive according to a first embodiment of the present invention includes an electrically conductive casing 1000, which is made of a stainless steel in the illustrated embodiment. The casing 1000 has a plurality of side panels 1100, defining a receiving space therein, a front opening serving as a access opening, and a rear opening. Each of the side panels 1100 has an inner surface and an outer surface. A stop plate 1200 and two mounting plates 1300 are integrally formed at the rear opening of the casing 1000. The two mounting plates 1300 are provided with a screw hole 1310 each. Moreover, a plurality of arched elastic members 1110 is integrally formed on and outward protruded from the side panels 1100 of the casing 1000. The elastic members 1110 are made of an electrically conductive material, and have a convex portion protruded from the outer surface of the side panel of the casing. Please refer to FIG. 2 at the same time. A hard disk drive 2000 may be pushed into the receiving space in the casing 1000 via the front opening thereof and is stopped by the stop plate 1200 from moving out of the casing 1000 via the rear opening thereof.

Figure 3:
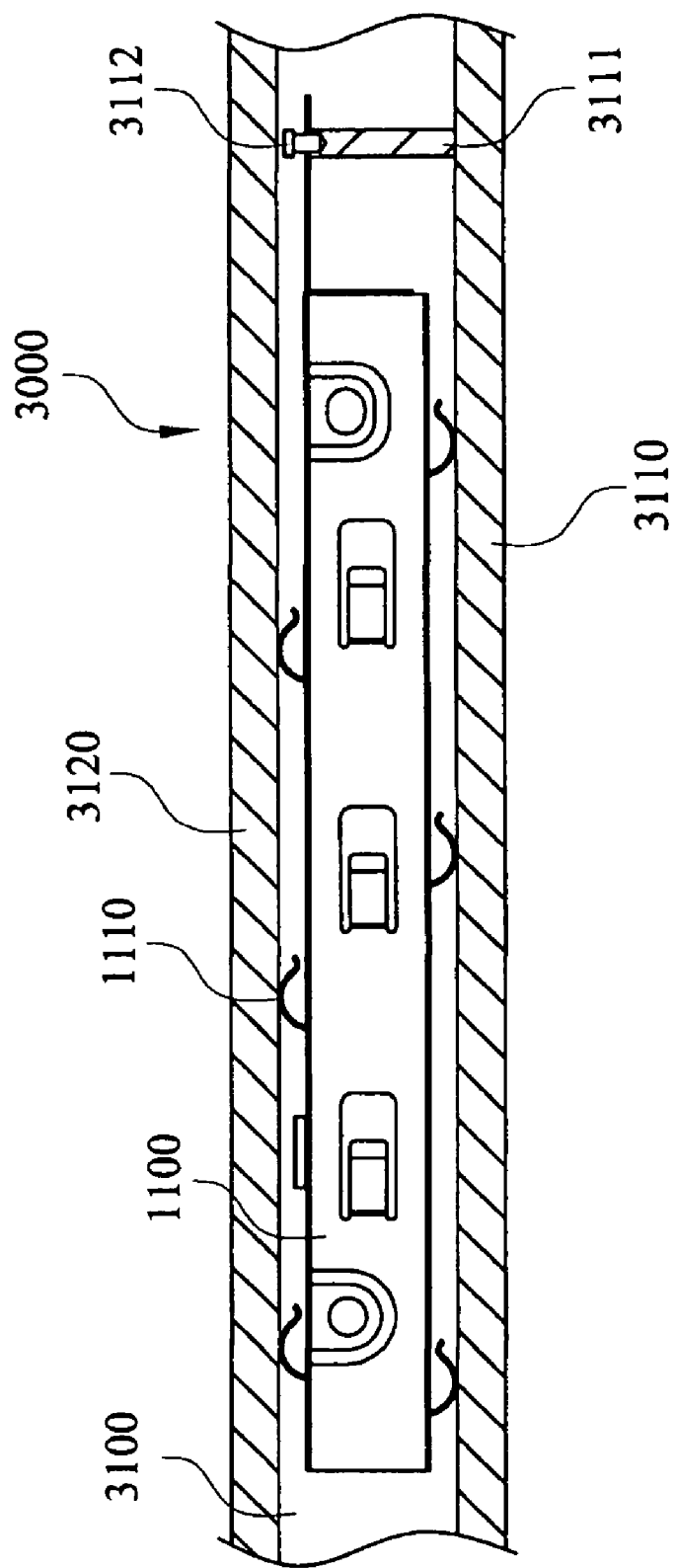
FIG. 3 is a longitudinal sectional view showing the anti-vibration and anti-EMI frame shown in FIG. 1, which is fixed in an electronic device.

Please refer to FIG. 3. The hard disk drive 2000 received in the casing 1000 may be fixed in a drive bay 3100 of an electronic device 3000, which is a notebook computer in the illustrated embodiment, so that the outer surfaces of the casing are faced toward inner wall surfaces of the drive bay 3100. The drive bay 3100 has a plurality of sides (not shown), a lower cover 3110, and an upper cover 3120. The lower cover 3110 is provided on its inner wall surface with two upward extended and internally threaded hollow posts 3111 corresponding to the two screw holes 1310 at the mounting plates 1300 of the casing 1000. To fix the hard disk drive 2000 in the drive bay 3100, firstly the hard disk drive 2000 is pushed to the casing 1000, so that the hard disk drive 2000 is securely held in the receiving space of the casing 1000. Then, the casing 1000 is place on the lower cover 3110 of the drive bay 3100, and two screws 3112 are fastened through the screw holes 1310 of the mounting plates 1300 into the internally threaded hollow posts 3111, so that the casing 1000 is securely connected to the lower cover 3110 of the drive bay 3100. Finally, the upper cover 3120 is placed at the top of the sides of the drive bay 3100. Therefore, the hard disk drive 2000 together with the casing 1000 is fixed in the electronic device 3000. In this position, the elastic members 1110 on the casing 1000 are in contact with the inner wall surfaces of two lateral ones of the a plurality of sides, the lower cover 3110, and the upper cover 3120 of the drive bay 3100 in the electronic device 3000. With the elasticity of the elastic members 1110, the hard disk drive 2000 in the casing 1000 is protected against vibration when it is fixed in the drive bay 3100. Moreover, since the casing 1000 and the elastic members 1110 integrally formed thereon are made of an electrically conductive material, the casing 1000 not only electrically grounds the hard disk drive 2000 received therein, but also shields electromagnetic interference to and from the hard disk drive.

Figure 4:
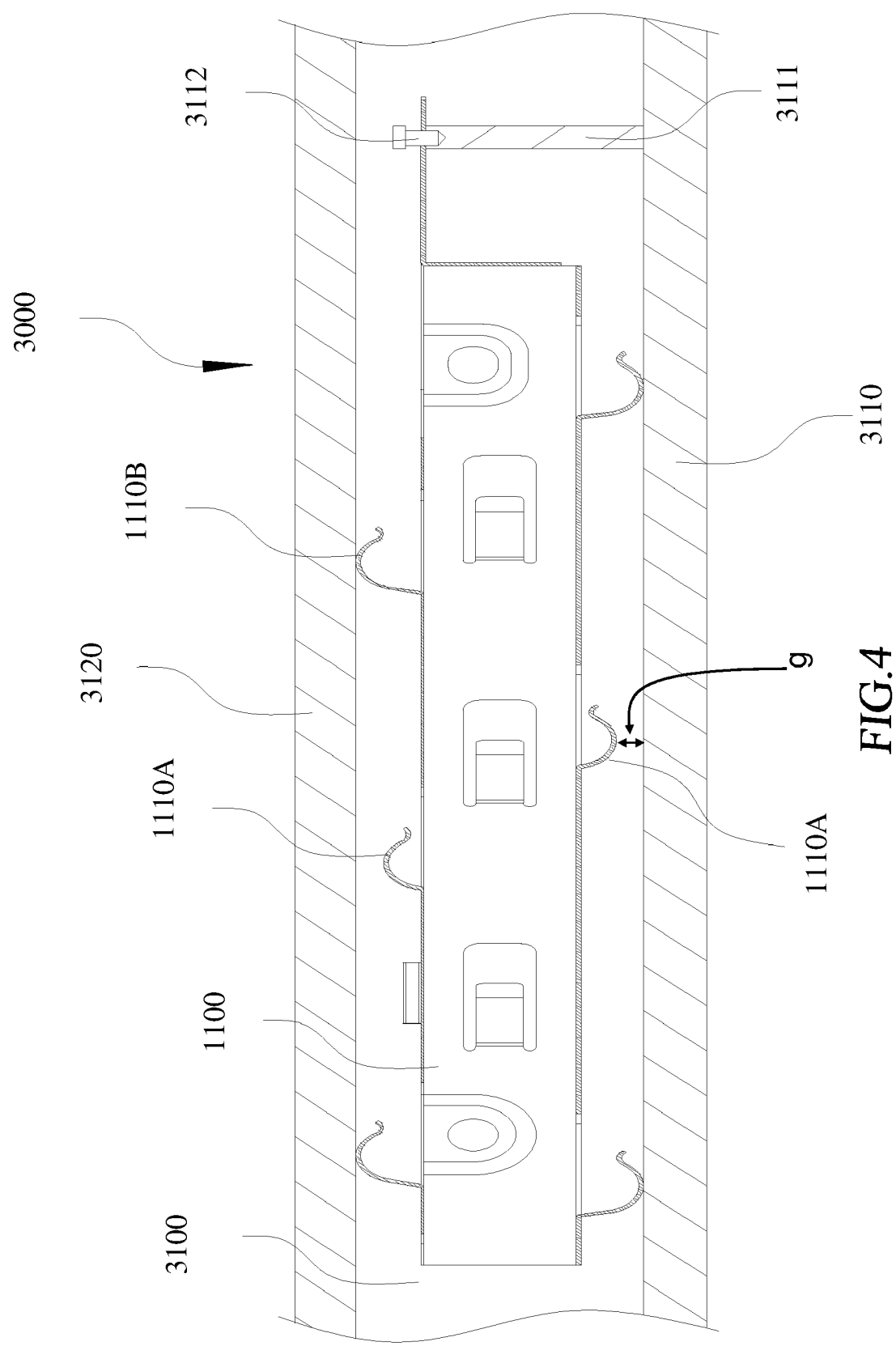
FIG. 4 is a longitudinal sectional view showing an anti-vibration and anti-EMI frame for hard disk drive according to a second embodiment of the present invention being fixed in an electronic device.

Please refer to FIG. 4 that shows a second embodiment of the present invention. For the purpose of providing an even better anti-vibration effect, first elastic members 1110A and at least one second elastic member 1110B are provided on the casing 1000. Second elastic members 1110B have a convex portion with a larger offset of protrusion, such that the vertical height of the second elastic members 1110B is substantially larger than that of first elastic members 1110A. In the illustrated second embodiment, the elastic members 1110A and 1110B are protruded from the casing 1000 with two different vertical distances. The second elastic members 1110B having a convex portion with the larger offset of protrusion have a smaller coefficient of elasticity, while the first elastic members 1110A having a convex portion with the smaller offset of protrusion have a larger coefficient of elasticity. Moreover, the elastic members 1110A and 1110B with different vertical distances are disposed on the side panels 1100 of the casing 1000 in staggered arrangement. In this manner, only the second elastic members 1110B with the larger offset of protrusion are normally in physical contact with the lower and upper covers 3110, 3120 of the drive bay 3100 of the electronic device 3000 for absorbing a relatively small impact and vibration, while a gap "g" is left between first elastic members 1110A and the lower and upper covers 3110, 3120 of the drive bay 3100. When the electronic device 3000 is subjected to a strong impact that would drive the casing 1000 to displace, the first elastic members 1110A with the smaller offset of protrusion come into contact with the lower and upper covers 3110, 3120 of the drive bay 3100, and the first elastic members 1110A with the smaller offset of protrusion would cooperate with second elastic members 1110B to absorb the strong impact and vibration.

In brief, the present invention is superior to the prior art because the electrically conductive casing 1000 is provided with integrally formed outward protruded elastic members 1110, which are in physical contact with the electronic device 3000 to protect the hard disk drive 2000 against vibration while providing a grounding effect. Moreover, the present invention may be easily manufactured and assembled to largely reduce the manufacturing cost of the electronic device.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An anti-vibration and anti-EMI frame for receiving a hard disk drive therein and holding the hard disk drive in a drive bay of an electronic device, comprising:

an electrically conductive casing having a plurality of side panels defining a receiving space therein, the side panels each having an inner surface and an outer surface facing toward at least one inner wall surface of the drive bay, and the electrically conductive casing having at least one access opening, so that a hard disk drive is held in the receiving space of the electrically conductive casing via the access opening;

a plurality of first elastic members integrally formed on at least one side panel of the electrically conductive casing, each of the first elastic members comprising at least one convex portion protruded from the outer surface of the side panel of the electrically conductive casing; and a plurality of second elastic members integrally formed on the at least one side panel of the electrically conductive casing, the offset elastic member second elastic members comprising at least one convex portion having an offset of protrusion larger than that of the convex portions of the first elastic members, wherein a vertical height of the second elastic members measured from the at least one side panel is larger than a vertical height of the first elastic members, and wherein the first and second elastic members are arranged such that when the hard disk is normally held in the receiving space of the electrically conductive casing, the convex portions of the second elastic members are in tight contact with the inner wall surface of the drive bay while the convex portions of the first elastic members are not in contact with the inner wall surface of the drive bay.

2. The anti-vibration and anti-EMI frame as claimed in claim 1, wherein the electrically conductive casing is made of a stainless steel material.

3. The anti-vibration and anti-EMI frame as claimed in claim 1, wherein the convex portion of each elastic member has a curved surface.

4. The anti-vibration and anti-EMI frame as claimed in claim 1, wherein the second elastic members with a larger offset of protrusion have a smaller coefficient of elasticity, and the first elastic members with a smaller offset of protrusion have a larger coefficient of elasticity, and wherein the first and second elastic members are formed on the electrically conductive casing in staggered arrangement.

5. The anti-vibration and anti-EMI frame as claimed in claim 1, wherein the electrically conductive casing is formed at an end opposite to the access opening with a stop plate for preventing the hard disk drive from being pushed out of the electrically conductive casing.

6. The anti-vibration and anti-EMI frame as claimed in claim 1, wherein the drive bay of the electronic device includes a plurality of sides, a lower cover, and an upper cover; the plural sides, the lower cover, and the upper cover together forming the drive bay for holding the electrically conductive casing therein; and wherein the electrically conductive casing is fixed in the drive bay with the second elastic members in contact with the lower cover, the upper cover, and two lateral ones of the plural sides of the drive bay.

7. The anti-vibration and anti-EMI frame as claimed in claim 6, wherein the electrically conductive casing is provided at an end opposite to the access opening of the electrically conductive casing with two mounting plates, each of which being provided with a screw hole; and the drive bay is provided with two internally threaded hollow posts corresponding to the two screw holes.

8. The anti-vibration and anti-EMI frame as claimed in claim 1, wherein the electronic device is a notebook computer.

9. The anti-vibration and anti-EMI frame as claimed in claim 1, wherein the first and second elastic members are arranged such that when the hard disk is subjected to a strong impact, the convex portion of at least one of the first elastic members comes in contact with the inner wall surface of the drive bay.

10. The anti-vibration and anti-EMI frame as claimed in claim 1, wherein the first members are arranged such that when the hard disk is normally held in the receiving space of the electrically conductive casing, the first elastic members are separated from the inner wall surface of the drive bay by a gap.

* * * * *